(12) United States Patent
Stoks et al.

(10) Patent No.: US 11,027,208 B2
(45) Date of Patent: Jun. 8, 2021

(54) MECHANICAL WATER TRANSFER SYSTEM

(71) Applicant: Landscape Structures Inc., Delano, MN (US)

(72) Inventors: Greg A Stoks, Greenfield, MN (US); Philip D. Burandt, Waconia, MN (US)

(73) Assignee: Landscape Structures Inc., Delano, MN (US)

( * ) Notice: Subject to any disclaimer, the term of this patent is extended or adjusted under 35 U.S.C. 154(b) by 208 days.

(21) Appl. No.: 16/400,234

(22) Filed: May 1, 2019

(65) Prior Publication Data

US 2019/0351339 A1   Nov. 21, 2019

Related U.S. Application Data

(60) Provisional application No. 62/671,551, filed on May 15, 2018.

(51) Int. Cl.
*A63G 31/00* (2006.01)
*B05B 12/00* (2018.01)
*B05B 17/08* (2006.01)
*A63B 9/00* (2006.01)

(52) U.S. Cl.
CPC .......... *A63G 31/007* (2013.01); *B05B 12/002* (2013.01); *A63B 2009/008* (2013.01); *B05B 17/08* (2013.01)

(58) Field of Classification Search
USPC ............ 137/484.6, 487, 496; 472/128
See application file for complete search history.

(56) References Cited

U.S. PATENT DOCUMENTS

| | | | | |
|---|---|---|---|---|
| 3,823,733 A | * | 7/1974 | DuBois | F16K 17/19 137/496 |
| 3,945,401 A | * | 3/1976 | Greenwood | B60T 8/361 137/627.5 |
| 4,705,065 A | * | 11/1987 | McNeely | F16K 17/10 137/484.6 |
| 2014/0261783 A1 | * | 9/2014 | Bush | E03D 5/105 137/487 |

OTHER PUBLICATIONS

Installation and Operation Manual Willoughby Lead-Free Valve Assemblies, dated Dec. 2016, 25 pages.

* cited by examiner

*Primary Examiner* — Kien T Nguyen
(74) *Attorney, Agent, or Firm* — Wesley W. Malherek; Kelly, Holt & Christenson, PLLC (57) ABSTRACT

A playground water feature including a feature outlet. The playground water feature also including a diaphragm valve configured to receive water flow from a water source. The playground water feature also including a mechanical activator, configured to, when actuated, open a vent valve, that is fluidically coupled to the diaphragm valve, such that the diaphragm valve opens to allow the water flow to flow to the feature outlet.

18 Claims, 10 Drawing Sheets

MECHANICAL WATER TRANSFER SYSTEM

CROSS-REFERENCE TO RELATED APPLICATION

The present application is based on and claims the benefit of U.S. provisional patent application Ser. No. 62/671,551, filed May 15, 2018, the content of which is hereby incorporated by reference in its entirety.

BACKGROUND

Water is an essential resource for many activities. For example, farmers require water to irrigate their fields or it can be used as a coolant. Water can also be used to foster interactions between children during play.

One common feature in parks and recreation areas is a splash zone, or splash pad. Many splash pads have one or more activities that require water to be transported, distributed, and sometimes collected for later re-use.

SUMMARY

A playground water feature including a feature outlet. The playground water feature also including a diaphragm valve configured to receive water flow from a water source. The playground water feature also including a mechanical activator, configured to, when actuated, open a vent valve, that is fluidically coupled to the diaphragm valve, such that the diaphragm valve opens to allow the water flow to flow to the feature outlet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Traditionally, water flow is actuated within a splash pad environment using electricity. For example, electricity either needs to be provided on site (e.g. through a battery, solar power, etc.) or the site needs to be electrically wired. However, in many areas, it is not feasible to transport energy to a site where water transportation is needed. For example, it may not be possible to run wires through a park without significant disturbance to existing wildlife. Further, the cost to install electricity may be extensive, particularly when the distance from a power source is long. There may also be some application for some examples discussed herein, such as farm irrigation, where it may not be possible to use electricity. Electricity can also present corrosion risks when used in water-rich environments. Activation devices often need to be replaced once corroded.

Additionally, while it may be possible to use a battery to provide the necessary power, batteries require replacement (e.g. once each year). For many parks and recreation areas, it is not desired to have parts that require frequent replacement. Further, whether electricity or another discrete power source is implemented, a control panel is required to set up operational constraints—e.g. when the water flow will initiate, how much water will flow, how fast it will be dispensed, how fast it will be collected, etc.

It is desired to have a solution that is purely mechanical, meaning that it does not require electricity for activation. This would eliminate the need for a control panel, as well as the need to provide power locally. In one example, the system is a manually controlled system such that, when activated, water flows through the splash pad activity units at a flow rate, for a flow duration. After the flow duration has elapsed, the water flow ceases.

Figure 1:
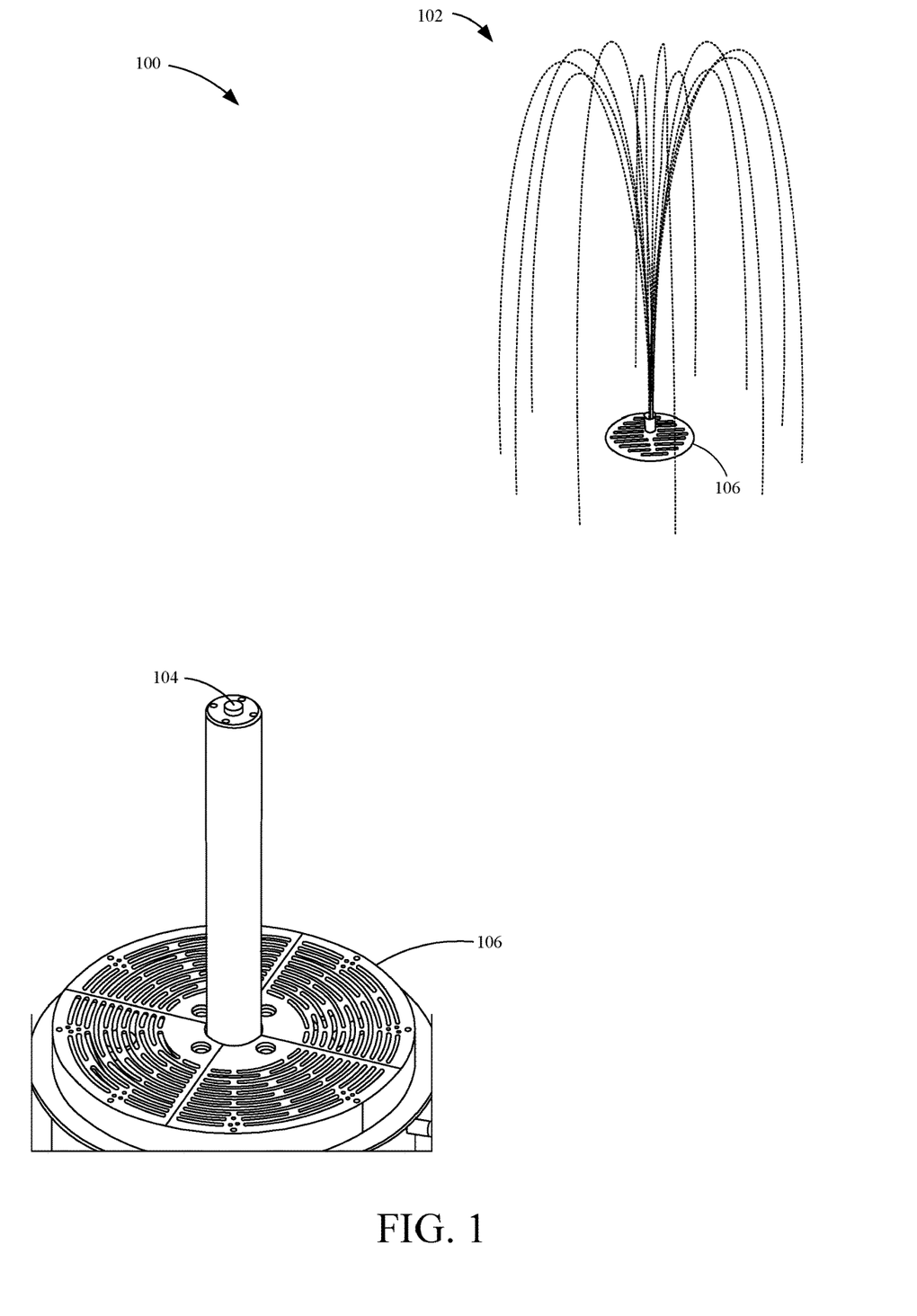
FIG. 1 is a perspective view showing an example play environment.

FIG. 1 is a perspective view showing an example play environment 100. Play environment 100 includes a water feature 102, an actuator 104 and drains 106. Water feature 102 includes a fountain that disperses water for a rich play environment. The shown fountain disperses vertically and in multiple directions. In other examples, the fountain can disperse water in different ways. Water feature 102 is actuated by actuator 104. As shown, actuator 104 is a button that a user can actuate to turn on water feature 102, that is, enable water flow from a water source to the water feature 102. As water is dispersed from water feature 102 it empties onto a surface of play environment 100 and typically exits play environment 100 by drain 106 or evaporation.

Figure 2A:
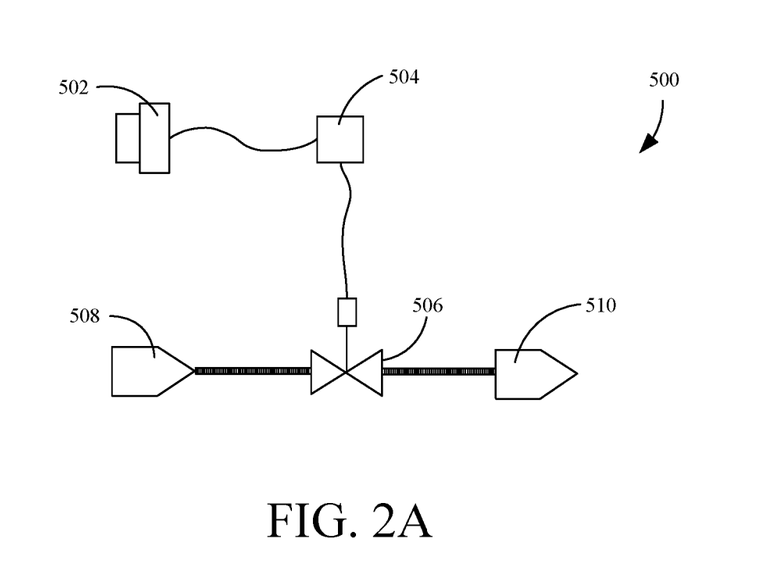
FIG. 2A is a schematic view showing an example water mechanical water valve assembly.

FIG. 2A is a schematic view showing an example water mechanical water valve assembly 500. As shown, activator 502 is coupled to vent 504 which is coupled to the normally closed diaphragm valve 506. Normally closed diaphragm valve 506 controls flow from water supply 508 to water outlet 510. Water outlet 510, for example, can lead to a water feature, such as water feature 102 in FIG. 1. In the shown diagram, activator 502 opens vent 504 which vents to atmosphere and allows normally closed diaphragm valve 506 to open and allow water from water supply 508 to water outlet 510. In examples designed for installation in water recreation environments, activator 502 may include a physical, depressible button. However, in other examples, other actuation mechanisms are also envisioned such as, but not limited to, a rotatable actuator or a pressure plate.

By adjusting vent 504 and diaphragm valve 506, a set amount of time can be chosen to open diaphragm valve 506. For example, one press of activator 502 may enable water flow from water supply 508 to water outlet 510 for ten seconds, thirty seconds, sixty seconds, ninety seconds, etc. In at least some examples, the system can dispense smaller fluid flows for shorter times—for example 1 gallon of water/minute for a minute. However, in other examples, the system is configured to dispense larger flow rates, for example 10 gallons/minute, 100 gallons/minute, or more.

Additionally, in another example, the system is configured to have a longer flow duration, for example for 5 minutes, or 10 minutes, or 30 minutes, or 60 minutes or longer. In one example, vent valve 504 includes a vent similar to vent 240 in FIGS. 3A and 3B. In another example, vent valve 504 could operate mechanically to operate diaphragm valve 506 and how long it stays open. For instance, a mechanical vent valve 504 could include a friction valve that closes slowly due to resistance by friction. In another example, vent valve 504 could operate with pressure to operate diaphragm valve 506 and how long it stays open. For instance, pressure would build when the button was depressed, and it would be slowly bled off (instead of a vacuum being bled off like in FIGS. 3A and 3B). The slow pressure bleed off would control how long the diaphragm valve would stay open.

Figure 2B:
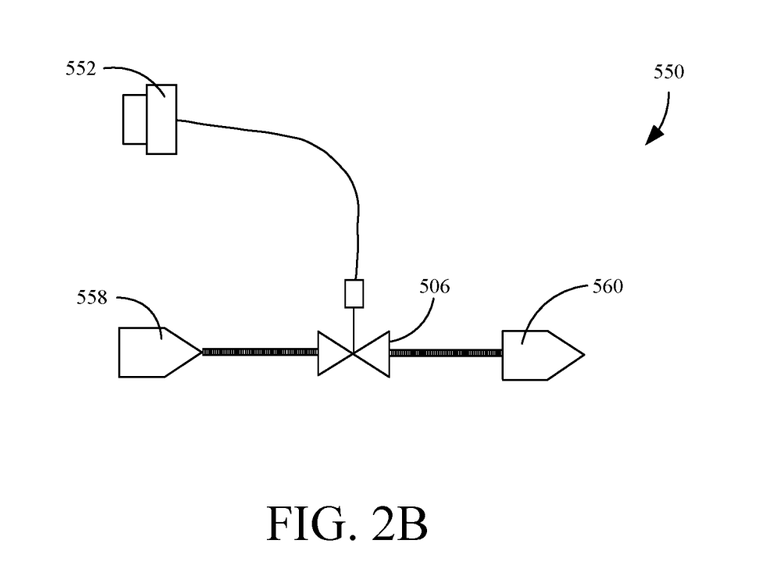
FIG. 2B is a schematic view showing an example mechanical water valve assembly.

FIG. 2B is a schematic of a mechanical water valve assembly 550. Activator 552 as shown is coupled directly to diaphragm valve 506. Upon pressing activator 552 diaphragm valve 506 is opened and allows water to flow from water supply 558 to water outlet 560. In this example, there is no vent. However, a vent can be in the alternate event can be integrated in activator 552 or integrated in diaphragm valve 506.

Figure 3A:
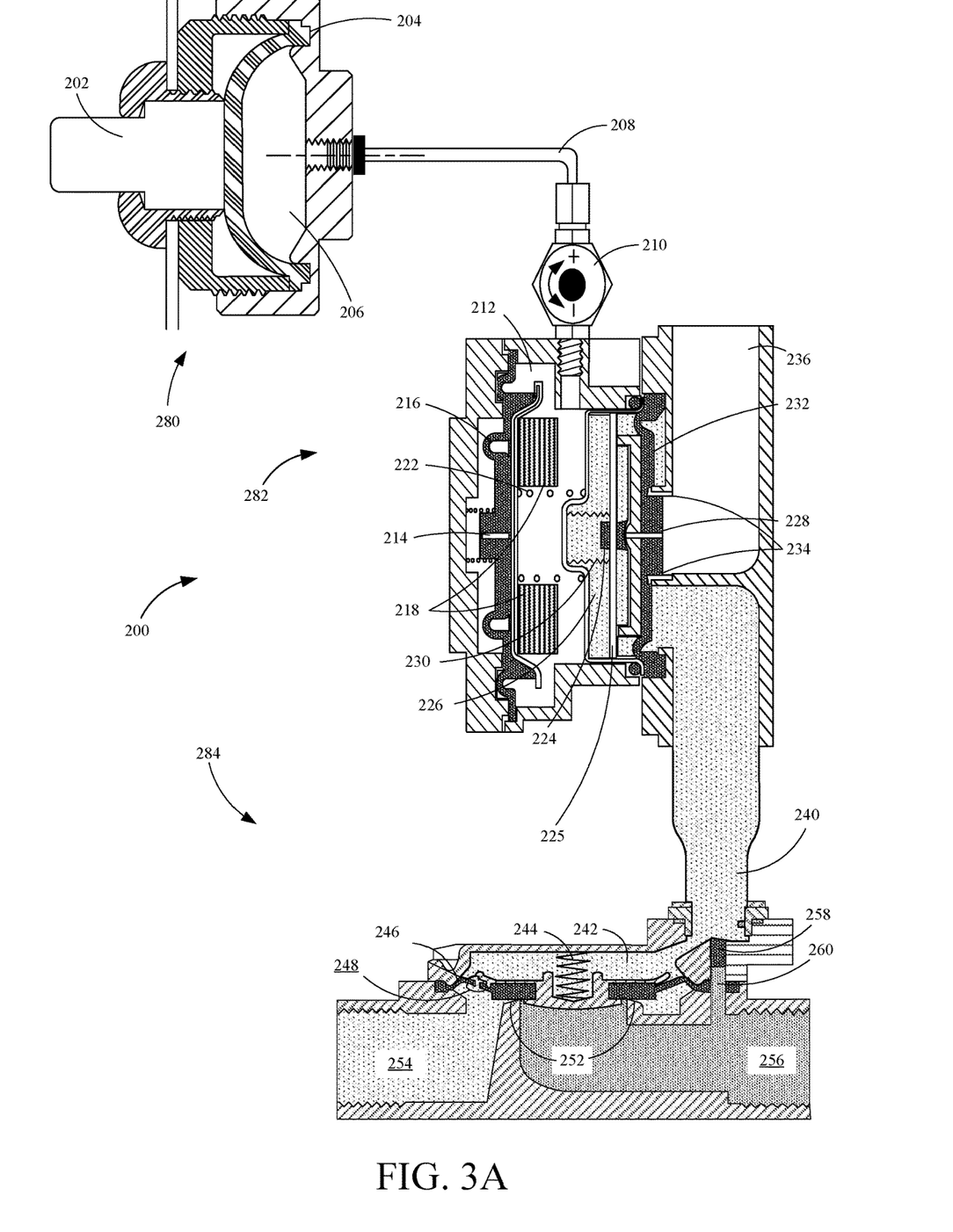
FIGS. 3A and 3B are cutaway sectional view showing an example mechanical water valve.

FIG. 3A is a cutaway sectional view showing an example mechanical water valve assembly 200. As shown, a user actuates button 202 of actuator 280 to enable water flow from water supply 254 to water outlet 256. For example, water outlet 256 may flow to a water feature, such as water feature 102 in FIG. 1. Actuator 280, vent 282 and water valve 284 enable the function of dispensing water over a given time without using electrical controls.

When button 202 is depressed, it deforms membrane 204 and changes volume 206 which forces air through fluid line 208 into volume 212. Volume 212 is enclosed at least in part, by membrane 216. As air is forced into volume 212, pressure increases in volume 212 and air is forced out through check valve 214. Check valve 214 allows air out of volume 212 but does not allow air from atmosphere to enter volume 212 through check valve 214.

Upon release of button 202 membrane 204 returns to its original state which causes a decrease in pressure in volume 206 and volume 212. Because membrane 216 is more pliable than membrane 204, membrane 216 allows will be biased by atmospheric pressure to the right due to the vacuum created in volume 212. This causes magnets 218 to actuate to the right and magnetically attract plate 225 and orifice seat 224 towards the left against the force of spring 230. This opens orifice 228 allowing a release of pressure in volume 226 to vent outlet 236. This release of pressure changes the pressure differential on membrane 232 allowing membrane 232 to actuate to the left, such that membrane 232 no longer contacts membrane seats 234. This lack of contact causes vent 240 to open to vent outlet 236.

Figure 3B:
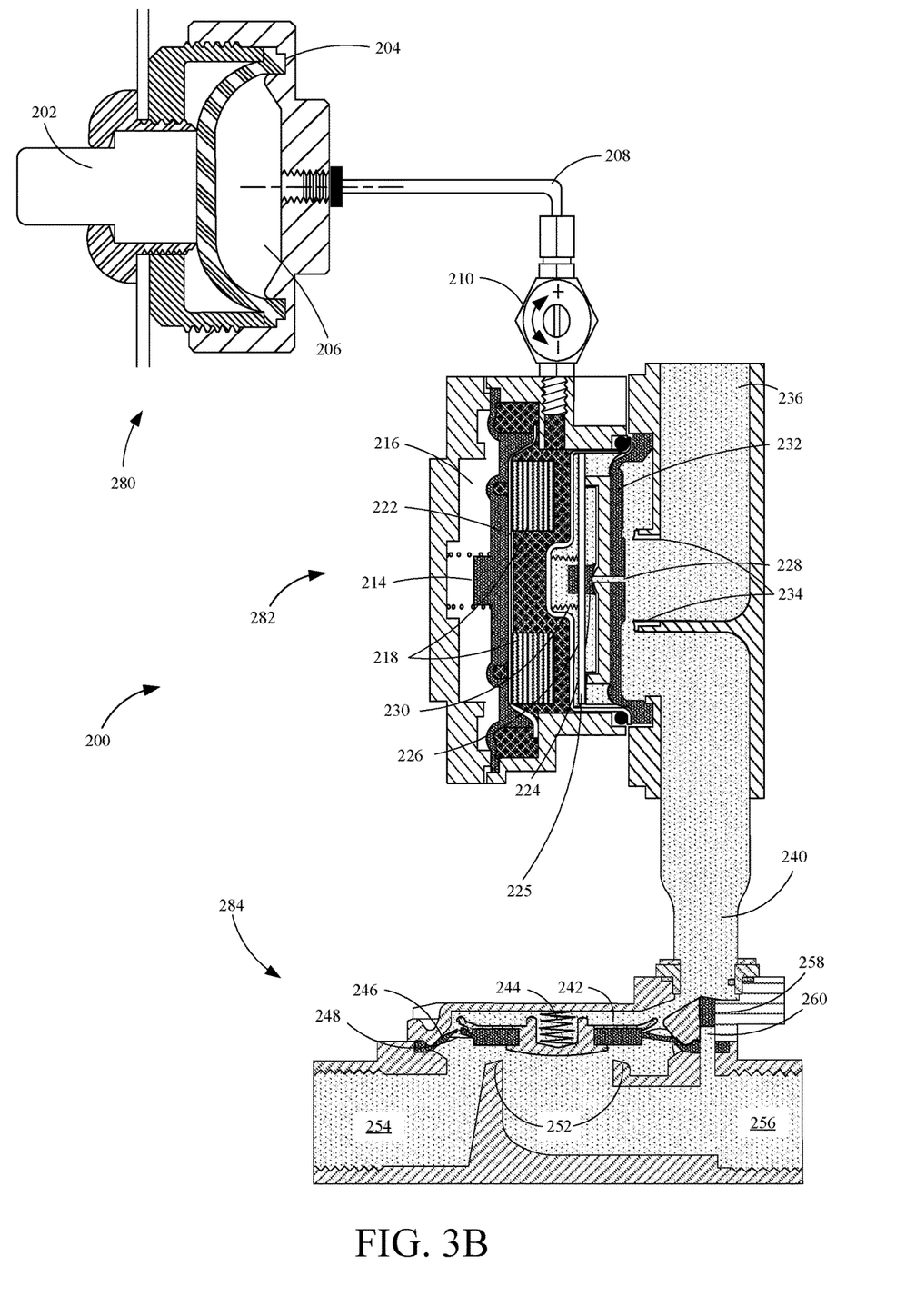

As shown in FIG. 3B when vent 240 is open, volume 242 experiences a pressure loss which forces membrane 246 upward against the force of spring 244, such that membrane 246 is lifted from seat 252 and water supply 254 is opened to water outlet 256.

In a standard water valve 248 there is a vent 260, however, in the shown example, vent 260 is plugged by plug 258 which redirects how the top side of the diaphragm is vented so it can be controlled by vent valve 280. This allows venting of the top side of the diaphragm through the vent valve 280 which controls the duration of how long diaphragm valve 284 is open.

To control a time that water supply 254 is open to water outlet 256, bleeder valve 210 can be adjusted which allows for a slow pressure return to atmosphere of volume 212. Once volume 212 release reaches atmospheric or near atmospheric pressure, spring 222 biases magnets 218 away from plate 225, which causes spring 230 to close orifice seat 224 on orifice 228, which increases the pressure differential between volume 226 and vent 240. This pressure differential forces membrane 232 against membrane seat 234, such that vent 240 is no longer venting to atmosphere (vent outlet 236). This closing vent 240 will increase pressure in volume 242 and eventually close membrane 246 against seat 252, such that water does not flow from water supply 254 to water outlet 256.

In one example, fluid line 208 has an inside diameter between ⅛" and ¼". In one example, lines 236 and 240 have an inside diameter up to ½". In one example, fluid lines 254 and 256 have an inside diameter between ½" and 2". In some examples, these components have different inside diameters to accommodate different water flow volumes and durations.

Figure 4:
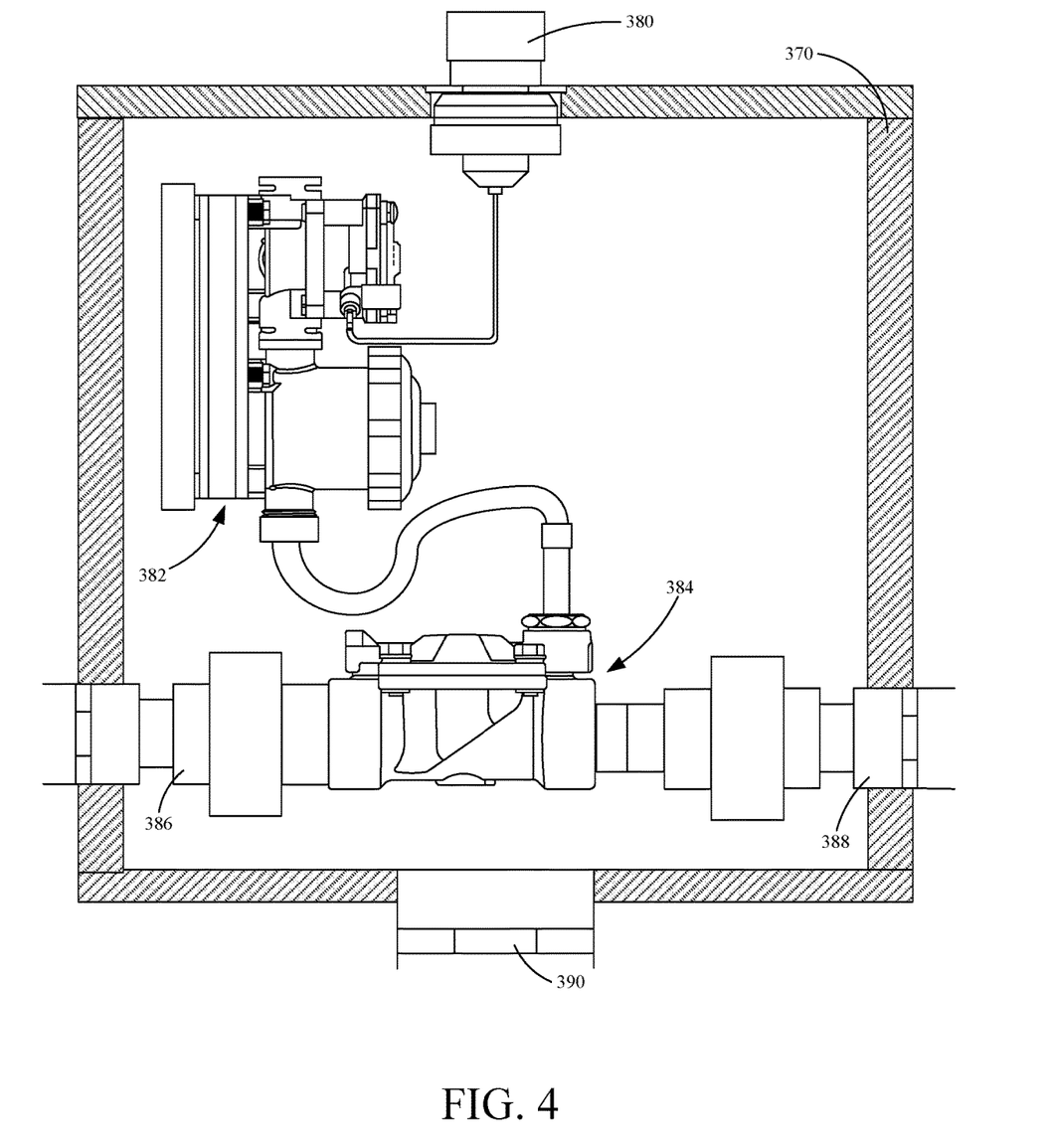
FIG. 4 is a sectional view showing an example mechanical water valve assembly.

FIG. 4 is a sectional view showing an example mechanical water valve assembly. Water valve 384 receives water from water source 386 and controls water flow to a water outlet 388. For example, a user actuates actuator 380 which opens vent 382 which in turn opens water valve 384 and allows water flow from left to right, that is from water source 386 to water outlet 388. These components are disposed within a drain housing 370, such that any water within housing 370 exits through drain 390 (e.g., vent 382 may vent a portion of water to atmosphere which will drain via drain 390). For at least some of the systems described herein, packaging considerations are present. For example, in a water recreation environment, it may be undesirable for the valve mechanisms to be readily accessible to the public. Therefore, in at least some examples, the flow control mechanisms (water valve 384 and vent valve 382) are disposed within a housing like drain housing 370, such that only actuator 380 is readily accessible for interaction by an individual.

In some examples, the system's mechanical nature allows it to be actuated at any time. However, in other examples, the system is designed to be non-functional during at least some hours. For example, the system may only be functional during operating hours of a splash pad environment. The system may go from a functional mode to a non-functional mode during non-operating hours. Such a feature may be a helpful safety mechanism, particularly for water recreation environments that are not walled off—e.g., systems in parks, playgrounds, etc. The ability to turn the fluid flow off during non-operating hours can help deter vandalism as well as injuries from unsupervised use.

Figure 5:
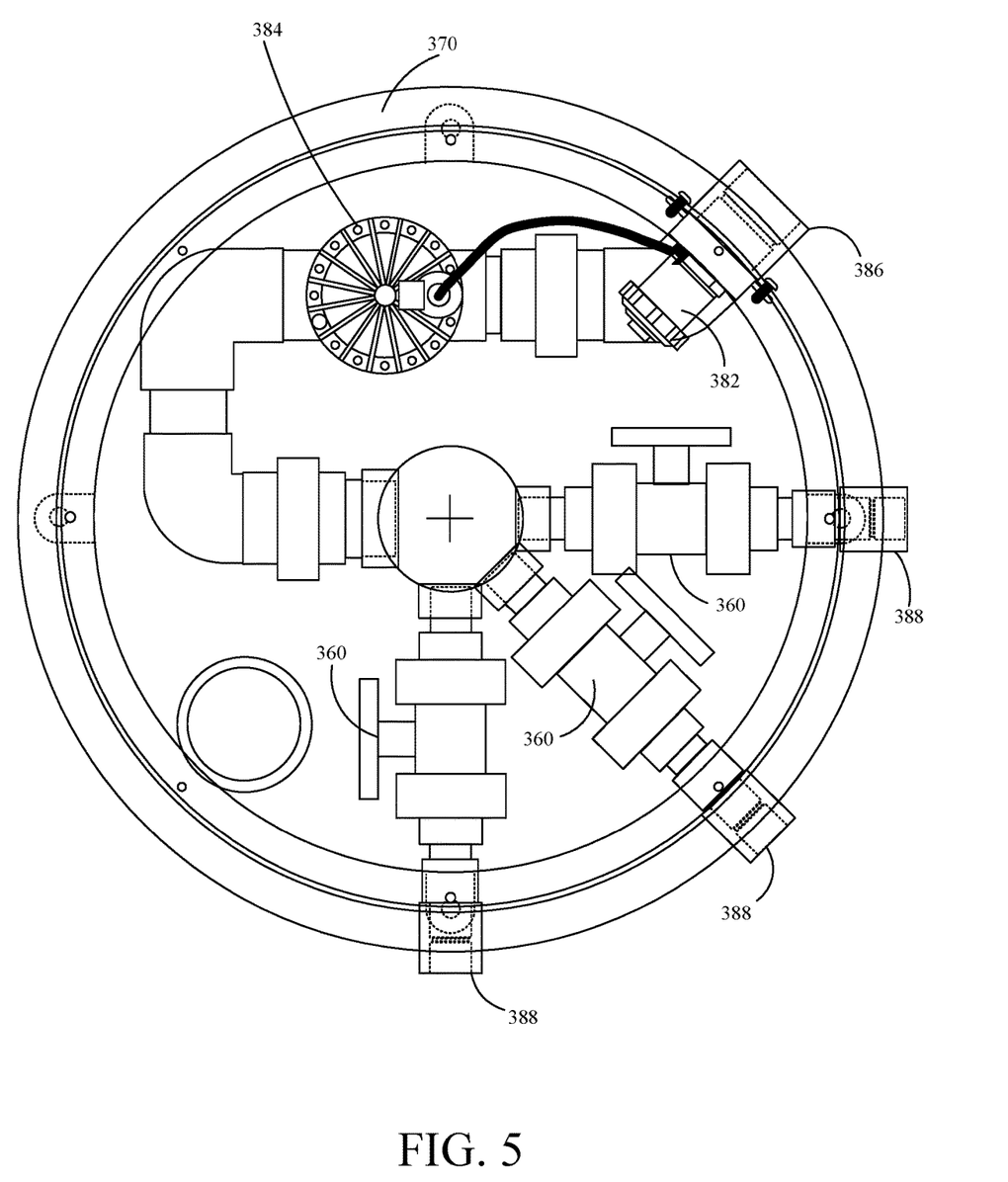
FIG. 5 is a top view showing a drain assembly.

FIG. 5 is a top view showing a drain assembly. As shown an actuator is coupled to vent 382, which is coupled to water valve 384. Water valves 384 receives water from a water supply 386 and dispenses water to water outlets 388 or controls flow to water outlets 388. Additionally, shown here are flow valves 360, which regulate the flow from water valve 384 to water outlets 388. For example, each water flow valve 360 can be actuated to dispense a different amount of water to the different outlets 388.

Figure 6A:
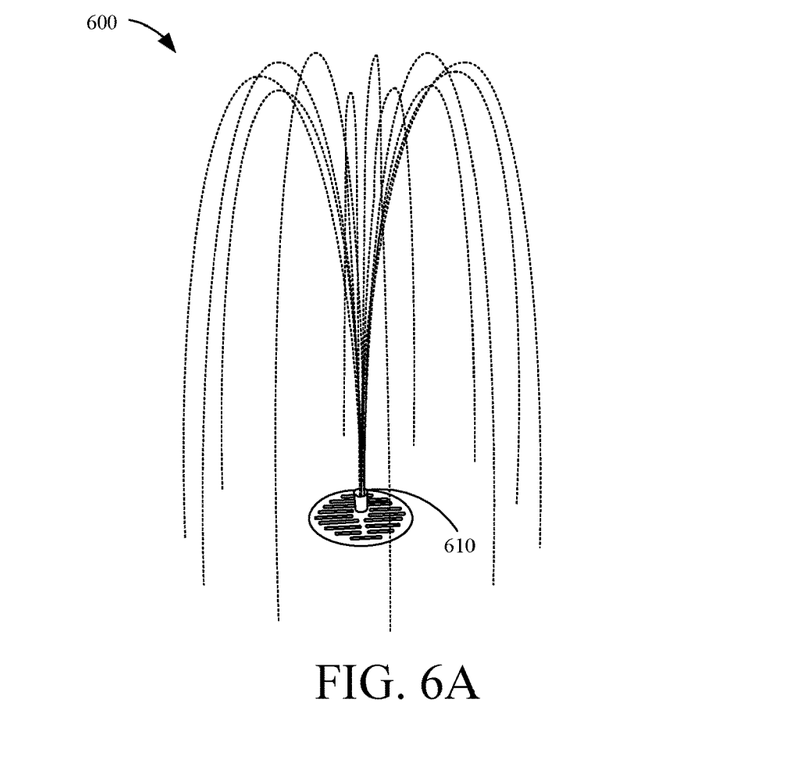
FIGS. 6A and 6B are diagrams showing an example water feature.
Figure 6B:
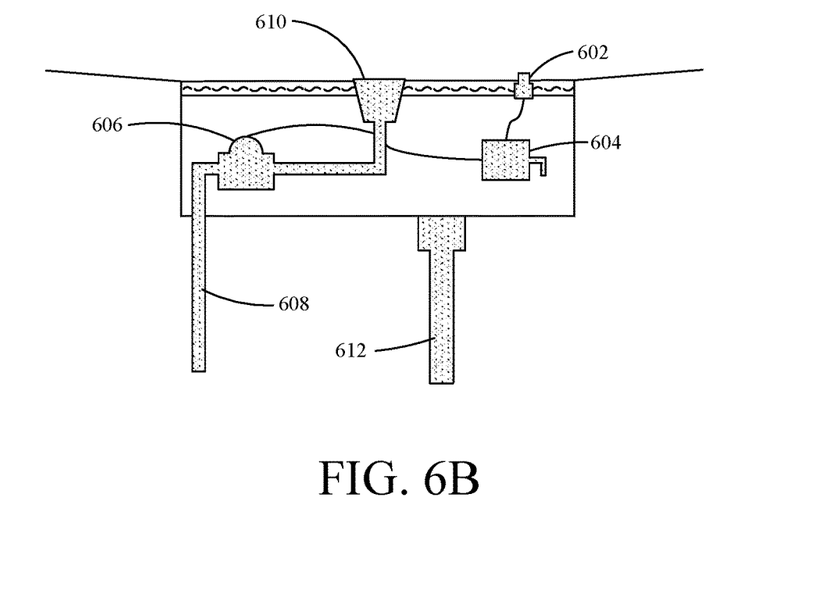

FIGS. 6A and 6B are diagrams showing an example water feature. Water feature 600 is a fountain. Water feature 600 includes a nozzle 610 where water is dispensed. To activate dispensing of the water. Button 602 is actuated to open vent valve 604 which actuates diaphragm valve 606 and allows water flow from a water supply 608 to the nozzle 610. As waters dispense from the water feature 600, it can be drained through drain 612. Also any water dispensed through vent valve 604 will exit through drain 612.

Figure 7A:
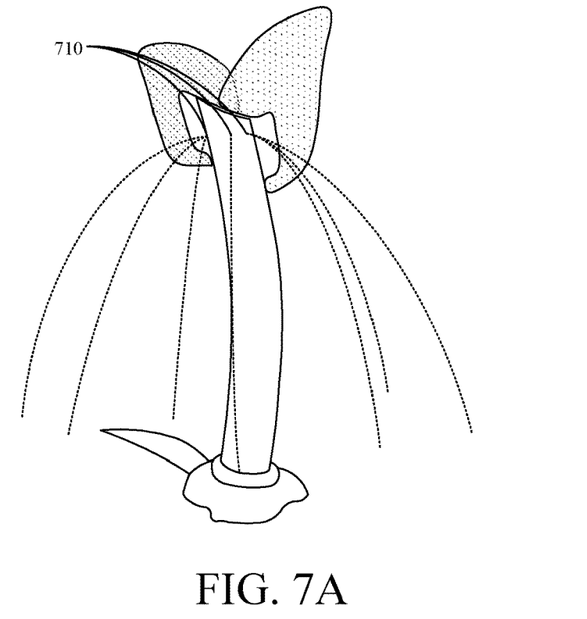
FIGS. 7A and 7B are diagrams showing an example water feature.
Figure 7B:
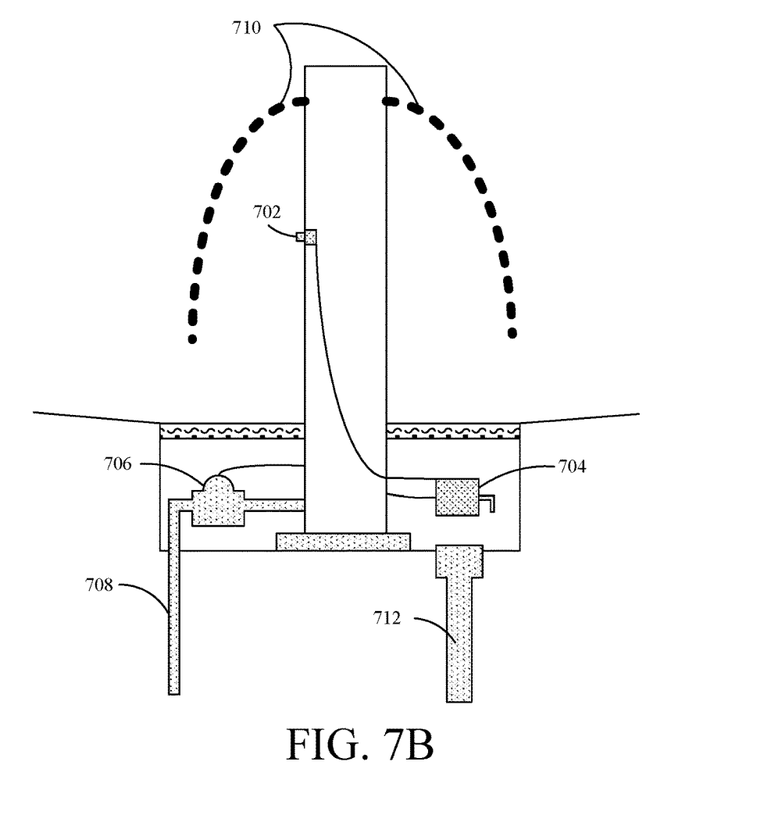

FIGS. 7A and 7B are diagrams showing an example water feature. Water feature 700 is a decorative plant fountain. Water feature 700 includes nozzles 710 where water is dispensed. To activate dispensing of the water. Button 702 is actuated to open vent valve 704 which actuates diaphragm valve 706 and allows water flow from a water supply 708 to nozzles 710. As waters dispense from the water feature 700, it can be drained through drain 712.

Figure 8A:
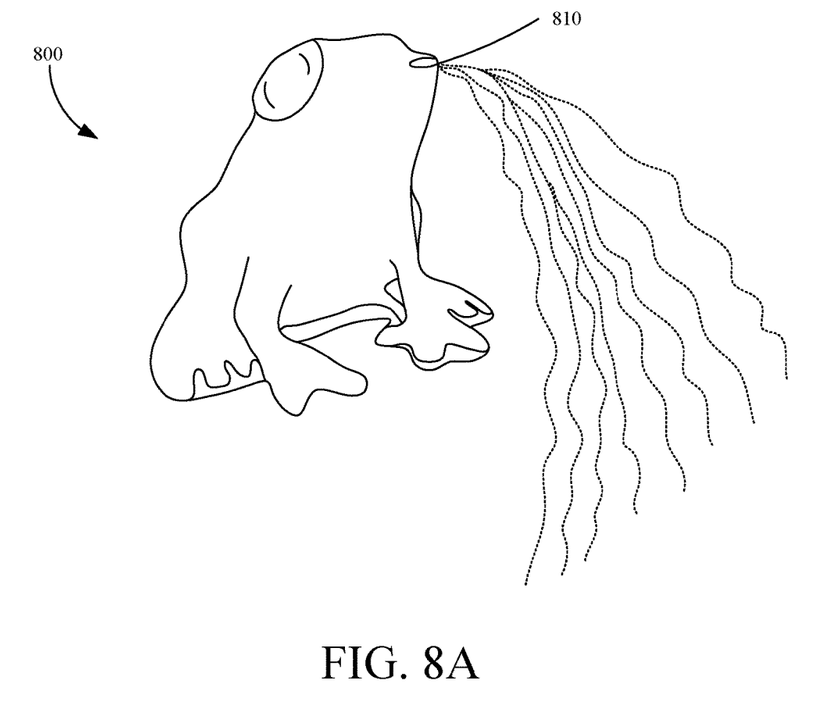
FIGS. 8A and 8B are diagrams showing an example water feature.
Figure 8B:
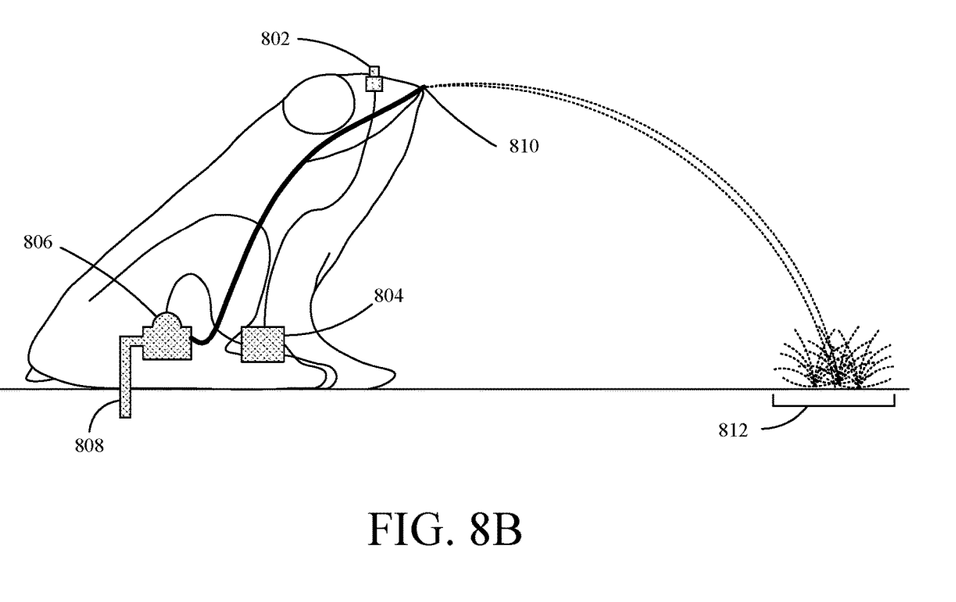

FIGS. 8A and 8B are diagrams showing an example water feature. Water feature 800 is a decorative animal statue fountain. Water feature 800 includes nozzles 810 where water is dispensed. To activate dispensing of the water. Button 802 is actuated to open vent valve 804 which actuates diaphragm valve 806 and allows water flow from a water supply 808 to nozzles 810. As waters dispense from the water feature 800, it can be drained through drain 812.

Figure 9A:
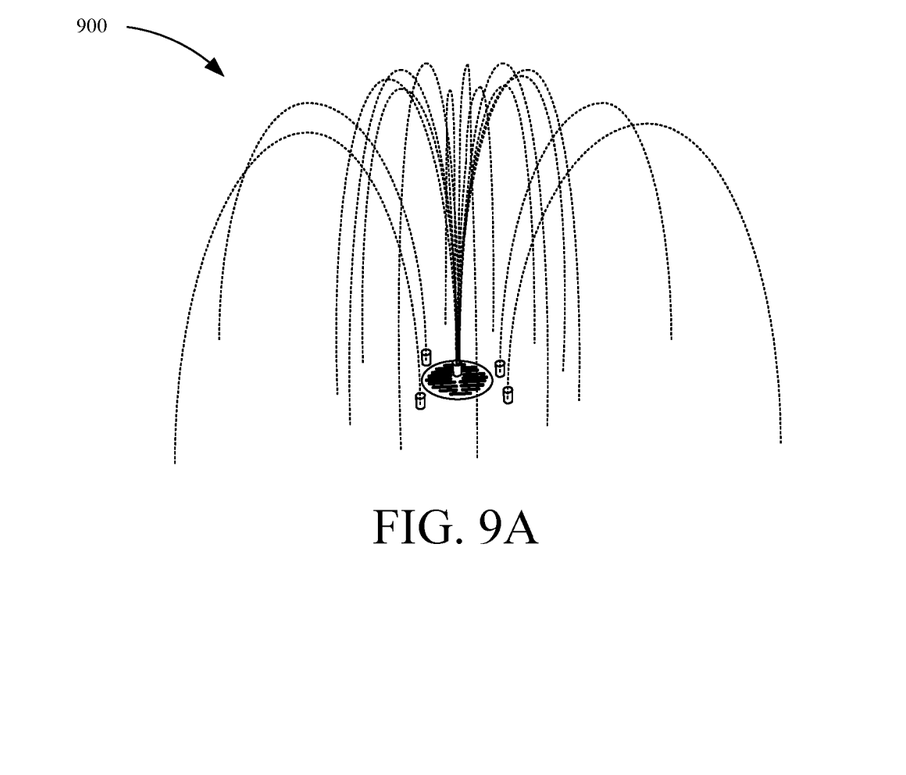
FIGS. 9A and 9B are diagrams showing an example water feature.
Figure 9B:
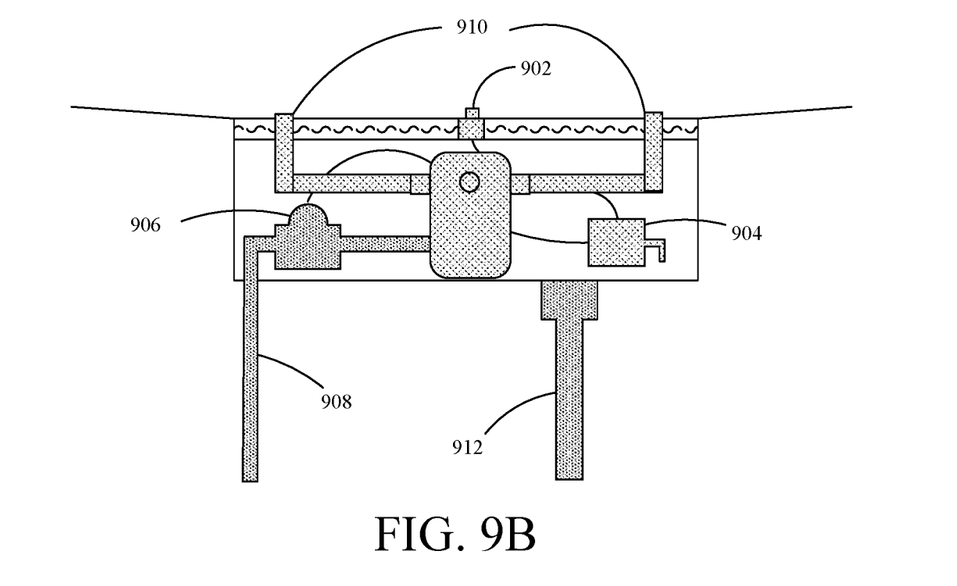

FIGS. 9A and 9B are diagrams showing an example water feature. Water feature 900 is a fountain. Water feature 900 includes a nozzle 910 where water is dispensed. To activate dispensing of the water. Button 902 is actuated to open vent valve 904 which actuates diaphragm valve 906 and allows water flow from a water supply 908 to nozzles 910. As waters dispense from the water feature 900, it can be drained through drain 912.

It should also be noted that the different embodiments described herein can be combined in different ways. That is, parts of one or more embodiments can be combined with parts of one or more other embodiments. All of this is contemplated herein.

Although the present invention has been described with reference to preferred examples, workers skilled in the art will recognize that changes may be made in form and detail without departing from the spirit and scope of the invention. Additionally, while the fluid transport systems described and illustrated herein are shown for use in the context of water recreation and splash pads, it is expressly contemplated that similar systems can be used for water, or other fluids, in different scenarios. For example, irrigation of fields can require electricity to pump water out to dispersal points. Systems described and illustrated herein can be used to provide water at a sufficient flow rate, for an appropriate flow duration, to from a water reservoir to an irrigation system.

What is claimed is:

1. A playground water feature comprising:
a feature outlet;
a diaphragm valve configured to receive water flow from a water source;
a mechanical activator, configured to, when actuated, open a vent valve, that is fluidically coupled to the diaphragm valve, such that the diaphragm valve opens to allow the water flow to flow to the feature outlet when the vent valve is opened; and
a plug that plugs a second vent from a portion of a fluid stream after the diaphragm valve to the vent valve.

2. The playground water feature of claim 1, wherein when the vent valve is opened, a rear volume of the diaphragm valve is vented to atmosphere.

3. The playground water feature of claim 1, wherein the mechanical activator is configured to create a vacuum in the vent valve.

4. The playground water feature of claim 3, further comprising an adjustable bleeder valve that bleeds pressure into the vacuum.

5. The playground water feature of claim 4, wherein the adjustable bleeder valve controls a duration that the water flows to the feature outlet.

6. The playground water feature of claim 1, wherein the vent valve comprises a check valve.

7. The playground water feature of claim 1, further comprising a drain and a drain housing, wherein the diaphragm valve and the vent valve are disposed in the drain housing.

8. The playground water feature of claim 1, wherein the mechanical activator comprises a button and one actuation of the button mechanically opens the diaphragm valve to allow the water flow to flow to the feature outlet for a set amount of time and after the set amount of time, the diaphragm valve closes.

9. The playground water feature of claim 8, wherein the set amount of time is greater than one minute.

10. A mechanical water valve for a playground, the mechanical water valve comprising:
an inlet configured to receive water from a water source;
an outlet configured to provide the water to a water feature of the playground;
a mechanical diaphragm valve configured to control water flow from the inlet to the outlet;
a vent comprising a magnet and a membrane, the vent fluidically coupled to the mechanical diaphragm valve; and
a mechanical actuator fluidically coupled to the vent, wherein actuating the mechanical actuator causes a pressure drop in the mechanical diaphragm valve that opens the mechanical diaphragm valve such that the water flows from the inlet to the outlet.

11. The mechanical water valve of claim 10, wherein the mechanical actuator comprises a button and an actuator membrane.

12. The mechanical water valve of claim 10, further comprising a bleeder valve configured to control a duration that the mechanical diaphragm valve is open.

13. The mechanical water valve of claim 12, wherein the bleeder valve is adjustable to change the duration.

14. The mechanical water valve of claim 10, wherein the mechanical actuator is a pressure plate.

15. The mechanical water valve of claim 10, wherein the mechanical water valve is configured to be disposed in the water feature.

16. A playground water feature comprising:
a feature outlet;
a diaphragm valve configured to receive water flow from a water source;
a mechanical activator, configured to, when actuated, open a vent valve, that is fluidically coupled to the diaphragm valve, such that the diaphragm valve opens to allow the water flow to flow to the feature outlet when the vent valve is opened; and
a drain and a drain housing, wherein the diaphragm valve and the vent valve are disposed in the drain housing.

17. The playground water feature of claim 16, wherein the diaphragm valve comprises a plug that plugs a second vent from a portion of a fluid stream after the diaphragm valve to the vent valve.

18. The playground water feature of claim 17, wherein the mechanical activator comprises a button and one actuation of the button mechanically opens the diaphragm valve to allow the water flow to flow to the feature outlet for a set amount of time and after the set amount of time, the diaphragm valve closes.

* * * * *